United States Patent [19]

Ito

[11] Patent Number: 4,893,179

[45] Date of Patent: Jan. 9, 1990

[54] DIGITAL COLOR COPYING MACHINE

[75] Inventor: Takanori Ito, Kanagawa, Japan

[73] Assignee: Ricoh Company Ltd., Tokyo, Japan

[21] Appl. No.: 176,298

[22] Filed: Mar. 31, 1988

[30] Foreign Application Priority Data

Apr. 1, 1987 [JP] Japan .................................. 62-80794

[51] Int. Cl.$^4$ .......................... G03F 3/08; H04N 1/46; G03G 15/01
[52] U.S. Cl. ..................................... 358/79; 346/157; 355/327
[58] Field of Search .......................... 355/4, 326, 327; 346/157; 358/75, 79

[56] References Cited

U.S. PATENT DOCUMENTS

| | | | |
|---|---|---|---|
| 4,410,909 | 10/1983 | Uedo et al. ............................ | 358/75 |
| 4,469,433 | 9/1984 | Kurata et al. ............................ | 355/4 |
| 4,667,250 | 5/1987 | Murai .................................. | 358/283 |
| 4,739,397 | 4/1988 | Hayashi ............................ | 358/75 X |
| 4,789,892 | 12/1988 | Tsuzuki et al. .................... | 355/75 X |

Primary Examiner—Fred L. Braun
Attorney, Agent, or Firm—Oblon, Spivak, McClelland, Maier & Neustadt

[57] ABSTRACT

A digital color copying machine including a color-decomposing circuit for decomposing an incident color image into three fundamental colors and generating respective corresponding digital color signals; a color conversion circuit connected to the color-decomposing circuit for extracting a black component and one signal with the greatest density level from the three digital color signals and generating a plurality of fundamental color signals corresponding to the three digital color signals, and a first signal corresponding to the black component and a second signal corresponding to the one signal with the greatest density level; an image recorder connected to the color conversion circuit for recording on a predetermined medium images in the color corresponding to at least one of the fundamental color signals, the first signal and the second signal supplied thereto from the color conversion circuit; and a control circuit for controlling the color conversion circuit to deliver to the image recorder either the fundamental color signals and the first signal when recording in a plurality of colors in said first signal, the second signal when recording in the color corresponding to the second signal, or the first signal when recording in the color corresponding to the first signal.

3 Claims, 13 Drawing Sheets

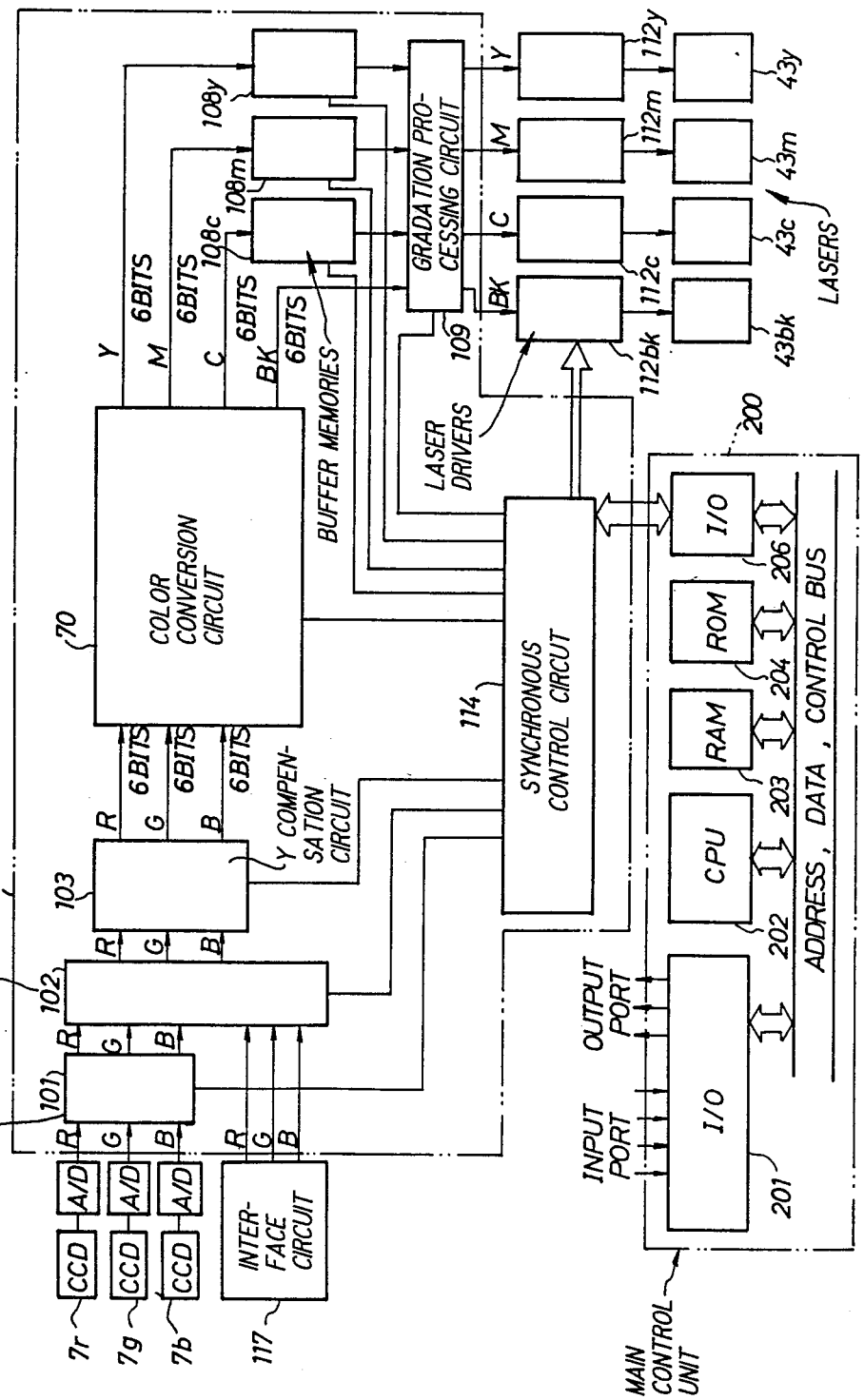

DIGITAL COLOR COPYING MACHINE

This invention concerns a digital color copying machine having a color recording mode and a monochrome recording mode.

In the reading system of a digital color copying machine, light reflected from an original document is generally color-decomposed into three primary colors of light, that is, each of fundamental colors red (R), green (G) and blue (B) by optical filters and the information of the original document is read for each of the decomposed fundamental colors. On the other hand, in the recording system of the digital color copying machine, three primary colors of ink, that is, cyan (C), magenta (M) and yellow (Y) are recorded in combination, thereby reproducing predetermined colors on a recording paper. Accordingly, in the digital color copying machine, information for R, G, B obtained from the reading system is converted into signals for C, M, Y and the recording systems for the respective colors are energized according to these signals C, M, Y.

Further, in order to improve the reproducibility of the black color represented as the synthesized color from C, M and Y, there is such a digital color copying machine as having a recording system exclusively used for black (BK). The copying machine of this type prepares image signals for four colors C, M, Y and BK from the input image signals for three colors but records the black component of the image only with a black toner in place of the combination of the C, M and Y color toners.

By the way, while the color copying machine is mainly used for reproducing the color images, it may sometimes be used for the reproduction of black/white images. In addition there is such a case that one of the colors C, M, Y, R, G and B is selected for reproducing an image by a single color. In view of the above, there is proposed a color copying machine having a monochromatic mode (Japanese Patent Laid-Open No. 61-196674). The conventional color copying machine of this type is adapted to select the signal with the greatest level among three color signals for R, G and B obtained from an image scanner upon designating the monochromatic mode and energize the black recording system by the signal selected thereby.

In the apparatus of this type, substantially all of the images of the original document are recorded by the monochromatic mode. However, depending on the application uses, there is such a case of preparing a copy of an original image a portion of which is erased.

The object of this invention is to provide a digital color copying machine having multi-functions capable of satisfying various users demands at a reduced cost.

The object of this invention is attained by a digital color copying machine comprising;

a color-decomposing means for color-decomposing color image projected thereto into three fundamental colors and generating three digital color signals corresponding respectively to said three fundamental colors;

a color conversion means connected to said color-decomposing means for extracting a black component and one signal with the greatest density level from said three digital color signals and generating a plurality of fundamental color signals corresponding to said three digital color signals, a first signal corresponding to said black component and a second signal corresponding to said one signal;

an image recording means connected to said color conversion means for recording on a predetermined medium images in the color corresponding to at least one of said fundamental color signals, said first signal and said second signal supplied thereto from said color conversion means respectively; and a control means connected to said color conversion means for controlling signals delivered by said color conversion means such that said color conversion means delivers to said image recording means a plurality of said fundamental color signals and said first signal when said image recording means records said images in a plurality of colors corresponding to a plurality of said fundamental color signals and said first signal, delivers to said image recording means said second signal when said image recording means records said images in the color corresponding to said second signal, and delivers to said image recording means said first signal when said image recording means records said images in the color corresponding to said first signal.

According to this invention, since the full color mode and the monochromatic recording mode can be used selectively by the change of the mode, and the mode of recording all of the images on the original document and a mode of eliminating images at high saturation can be used selectively in the monochromatic recording mode, it is possible to satisfy the various demands of users.

As conducted so far in a device of carrying out color recording with four colors C, M, Y and BK, it is possible to extract only the black (BK) component from the three primary colors R, G, B or C, M, Y. In the case of recording using only the signal for the black component, those images not containing the black component do not appear in copy image. That is, since the images recorded with color at high saturation are erased on the copy images, a portion of the images can selectively be copied. For instance, if the content of the original document recorded in the black/white mode is checked and the result of the check is described, for example, in a red ink on the original document, since the red portion is erased upon copying the original document, a copy of the original document before check can be obtained.

The copying operation as described above is not suitable to the copying of the original images obtained by color recording since the necessary image portion is erased as well. However, such a copying operation is extremely useful function for users.

Further, in a digital color copying machine conducting recording for four colors, C, M, Y, BK, a circuit for extracting a BK signal can be used in common between the full color recording mode and the monochromatic recording mode. Accordingly, in the present invention, two kinds of circuits having contents to be processed different from each other are disposed for extracting a predetermined monochromatic signal, (for example, black) from inputted color image signals, so that monochromatic signal outputted from one of the circuits is used in the full color recording mode, while the selection for the two kinds of monochromatic color signals extracted from the two circuits described above can be changed in accordance with a switching operation.

In the embodiments described later, one of the two circuits for extracting the monochromatic signals is adapted as a circuit for extracting the BK component from the signals for three primary colors and the other of them is formed as a circuit for extracting the signal with the maximum level among the signals for three primary colors. When the monochromatic copying operation is conducted by a monochromatic signal extracted in the latter circuit, since all the images on the original document are copied, there occurs no partial dropping of the images even when color-recorded original document is used.

These and other objects, as well as the features of the present invention will become apparent by reading the following descriptions of preferred embodiments while referring to the accompanying drawings:

Preferred embodiments described later are merely means for the understanding of the present invention and various modification will be possible by those skilled in the art without departing the scope of this invention as defined in the scope of the claim for patent.

FIG. 3 is a block diagram for the electrical portions in the copying machine shown in FIG. 1;

Figure 1:
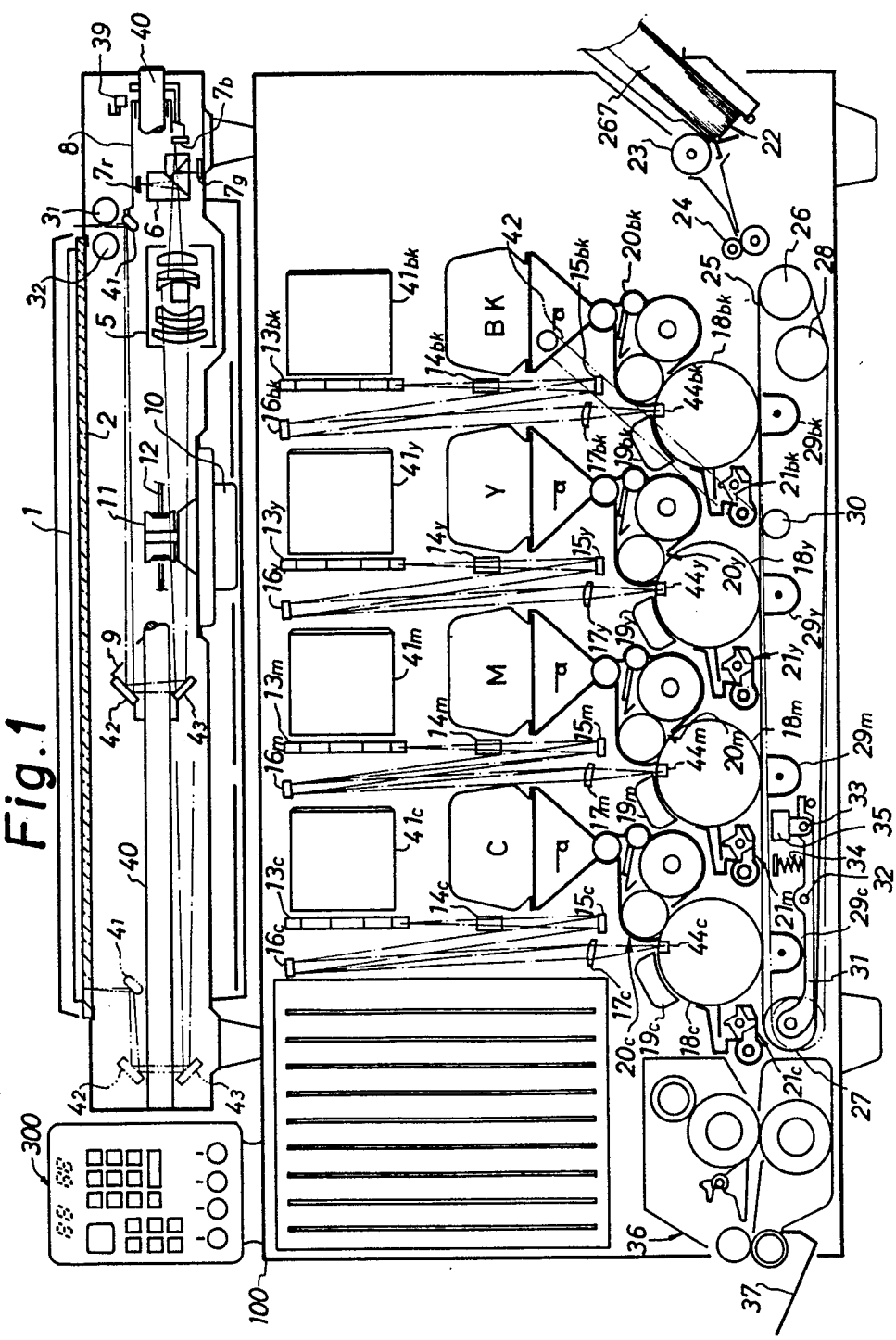
FIG. 1 is a front elevational view for one embodiment of a digital color copying machine according to this invention.

Referring to FIG. 1, an original document 1 is placed on a platen 2 made of contact glass and illuminated from fluorescent lamps $3_1$ and $3_2$. The light reflected from the original document 1 is reflected by a movable first mirror $4_1$, second mirror $4_2$ and third mirror $4_3$ and then entered by way of an imaging lens 5 into a dichroic prism 6, where the light is spectralized into light of three wavelength, that is, red (R), green (G) and blue (B). The spectralized lights are entered to solid state image pick-up devices CCD 7r, 7g and 7b respectively. That is, the red light is incident to CCD 7r, the green to CCD 7g and the blue light to the CCD 7b.

The fluorescent lamps $3_1$ and $3_2$, and the mirror $4_1$ are mounted on a first carriage 8, while the mirror $4_2$ and the mirror $4_3$ are mounted on the second carriage 9. The carriages 8 and 9 are slidably mounted on a shaft 40. Since the carriage 9 moves at the speed one-half of that of the carriage 8, the optical path length from the original document 1 to the CCD 7r, 7g and 7b are kept constant. Upon reading the original image on the original document 1, the carriages 8, 9 are scanned from the right to the left. The carriage 8 is connected to the carriage driving wire 12 wound around on the carriage driving pulley 11 secured to the shaft of a carriage driving motor 10 and the wire 12 is wound around on a sliding block not illustrated on the carriage 9. Thus, the carriage 8 and the carriage 9 move forwardly (scanning for original image reading) and backwardly (returning) by the forward and backward rotations of the motor 10, in which the carriage 9 moves at a speed one-half of that of the carriage 8.

Figure 2:
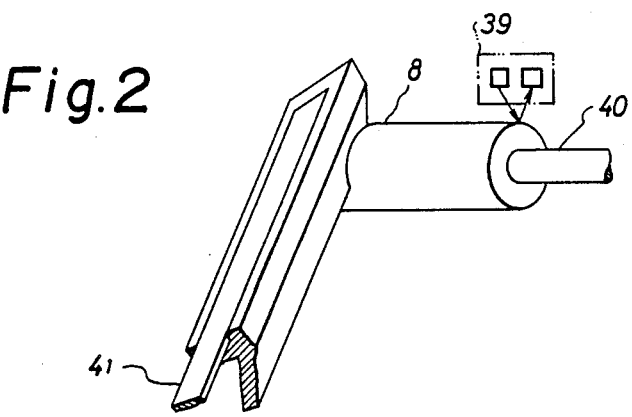
FIG. 2 is an enlarged view for a portion of a home position sensor in the copying machine shown in FIG. 1.

When the carriage 8 at the home position is shown in FIG. 1, the carriage 8 is detected by a home position sensor 39 which is a reflection type photosensor. The detection mode is shown in FIG. 2.

When the carriage 8 is driven leftwardly for the exposure scanning and when it is out of the home position, the sensor 39 is in a not-light receiving state (carriage not-detected). When the carriage 8 is driven rightwardly for the returning and returned to the home position, the sensor 39 takes the light-received state (carriage detected). When the sensor 39 changes from the not-light receiving state to the light receiving state, the carriage 8 is stopped.

In FIG. 3, outputs from CCD 7r, 7g and 7b are subjected to analog-digital conversion, applied with necessary processing in an image processing unit 100 and further converted into binary signals for black (BK), yellow (Y), magenta (M) and cyan (C) respectively which are the color information to be recorded. The respective binary signal are inputted to the laser drivers 112bk, 112y, 112m and 112c respectively and, when the laser drivers 112bk, 112y, 112m, 112c energize the semiconductor lasers 43bk, 43y, 43m, 43c respectively, laser beams modified with binarized signals as the color information to be recorded are outputted.

In FIG. 1, the laser beams exited from the laser 43bk is reflected at the rotational polygonal mirror 13bk passed through the f-$\theta$ lens 14bk, reflected at the fourth mirror 15bk and the fifth mirror 16y, passed through the cylindrical lens 17bk for correcting the slanting on the polygonal mirror surface and then illuminated and focused on the photosensitive drum 18bk.

In the same manner, the laser beam exited from the laser 43y is reflected at the rotational polygonal mirror 13y passed through the f-$\theta$ lens 14y, reflected at the fourth mirror 15y and the fifth mirror 16y, passed through the cylindrical lens 17y for correcting the slanting on the polygonal mirror surface and then illuminated and focused on the photosensitive drum 18y.

The laser beam exited from the laser 43m is reflected at the rotational polygonal mirror 13m, passed through the f-$\theta$ lens 14m, reflected at the fourth mirror 15m and the fifth mirror 16m, passed through the cylindrical lens 17m for correcting the slanting on the polygonal mirror surface and then illuminated and focused on the photosensitive drum 18m.

The laser beam exited from the laser 43c is reflected at the rotational polygonal mirror 13c passed through the f-$\theta$ lens 14c, reflected at the fourth mirror 15c and the fifth mirror 16c, passed through the cylindrical lens 17y for correcting the slanting on the polygonal mirror surface and then illuminated and focused on the photosensitive drum 18c.

The polygonal mirrors 13bk, 13y, 13m and 13c are secured to the rotational shafts of the motors 41bk, 41y, 41m and 41c for driving the polygonal mirror respectively, and the motors 41bk, 41y, 41m, 41c rotate at a constant speed to drive the polygonal mirrors 13bk, 13y, 13m and 13c at a constant rotational speed respectively. By the rotation of the polygonal mirrors 13bk, 13y, 13m and 13c, the laser beams described above are scanned in the direction in perpendicular to the rotational direction of the photosensitive drums 18bk, 18y, 18m and 18c (clockwise direction), that is, in the direction along the drum axis.

Figure 4:
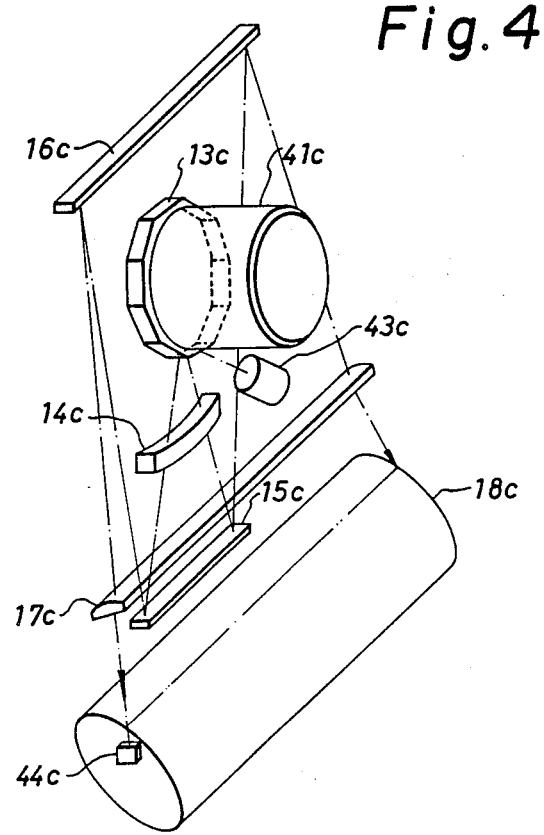
FIG. 4 is an exploded perspective view for a cyan color recording section in the copying machine shown in FIG. 1.

Description will be made specifically to the laser scanning system in the cyan color recording section of the copying machine shown in FIG. 1 while referring to FIG. 4.

A sensor 44c comprising an optoelectronic conversion element is disposed in such a relationship as receiving the laser beams at one end of the laser scanning (dotted chain) in the direction along the axis of the drum 18c. The sensor 44c detects the laser beams, and detects the starting point for one line scanning at the instance the state changes from the detected state to the non-detected state. That is, the detection signal for the laser beams (pulse) of the sensor 44c is processed as the line synchronizing pulse for the laser scanning. The constitution for the magenta recording section, the yellow recording section and the black recording section of the copying machine shown in FIG. 1 is quite the same as that for the cyan recording section shown in FIG. 4.

Referring then to FIG. 1, the surface of the drums 18bk, 18y, 18m and 18c are charged uniformly by means of charge scorotrons 19bk, 19y, 19m and 19c respectively connected to a high negative voltage generation device not illustrated. When the laser beams modulated by the recorded signals are irradiated on the uniformly charged surfaces of the drums 18bk, 18y, 18m and 18c respectively, electric charges at the surface of the drums 18bk, 18y, 18m and 18c flow to the equipment ground portion of the main body of the drums 18bk, 18y, 18m and 18c respectively and eliminated due to the photo conductivity phenomenon. The laser beams are not lighted up at the portion where the density of the original document 1 is high dense. Thus, the portions at the surface of the drums 18bk, 18y, 18m and 18c corresponding to the high density portions of the original document 1 are charged to the potential at $-800$ V, while the portions corresponding to the not low density portions of the original document 1 are charged to about $-100$ V, by which the electrostatic latent images are formed on the surfaces of the drums 18bk, 18y, 18m and 18c corresponding to the density of the original document 1. The electrostatic latent images are respectively developed by means of a black developing unit 20bk, a yellow developing unit 20y, a magenta developing unit 20m and a cyan developing unit 20c, to form images of the black, yellow, magenta and cyan toners respectively to the surfaces of the drums 18bk, 18y, 18m and 18c.

The toners in the units 20bk, 20y, 20m and 20c are positively charged by agitation, the units 20bk, 20y, 20m and 20c are biased to the bias voltage of about $-200$ V by a developing bias generation device not illustrated, the toners are deposited to the portions at the surface of the drums 18bk, 18y, 18m and 18c where the potential is higher than the bias voltage, and the toner images corresponding to the original document are formed on the drums 18bk, 18y, 18m and 18c respectively.

On the other hand, recording paper 267 stored in a transfer paper cassette 22 is delivered by the paper feeding operation of a roller 23 and sent to a transfer belt 25 at a predetermined timing by a roller 24. The recording paper 267 laid on the belt 25 is successively passed below the drums 18bk, 18y, 18m and 18c by the movement of the belt 25, and during passage of the drums 18bk, 18y, 18m and 18c respectively, toner images for black, yellow, magenta and cyan are successively transferred on the recording paper 267 under the effect of the transfer charger 29bk, 29y, 29m and 29c below the belt 25. The recording paper 267 transferred images is then sent to heat fixing unit 36 in which toners are secured to the recording paper and then the recording paper is discharged to a tray 37.

On the other hand, residual toners at the surface of the drums 18bk, 18y, 18m and 18c after the transfer are removed by cleaner units 21bk, 21y, 21m and 21c respectively.

The unit 21bk and the unit 20bk for collecting the black toners are connected by way of a toner collecting pipe 42 and the black toner gathered by the unit 21bk is collected by the unit 20bk. Since yellow, magenta and cyan toners collected by the units 21y, 21m and 21c are mixed with toners from developing units for different colors at the preceeding stage of these units, black toners deposited on the drum 18y such as by reverse transfer from the recording paper upon transfer are not re-collected for re-use.

Figure 5:
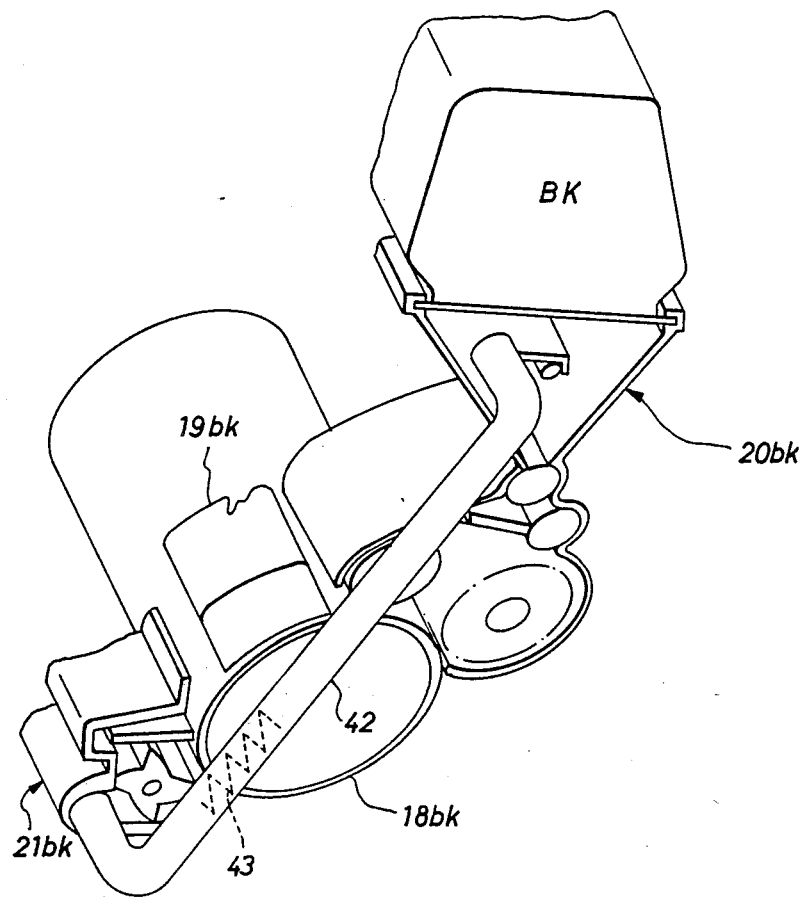
FIG. 5 is an enlarged perspective view for a portion of a toner reclaiming pipe in the copying machine shown in FIG. 1.

FIG. 5 shows the inside of the toner collecting pipe 42. A toner collecting auger 48 is disposed to the inside of the pipe 42. The auger 43 is formed as a coil spring and are freely rotatable at the inside of the pipe 42 bent in a channel-like shape. The auger 43 is driven in one rotational direction by driving means not illustrated and the toners gathered in the unit 21bk are sent to the unit 20bk by the spiral pump action of the auger 43.

The belt 25 for sending the recording paper 267 from the drum 18bk in the direction of the drum 18c is laid under stretch over an idle roller 26, a driving roller 27, an idle roller 28 and an idle roller 30 and driven in a counter clockwise rotational direction by the roller 27. The roller 27 is pivoted to the left end of a lever 31 pivoted to a shaft 32. A plunger 35 for black mode setting solenoid not illustrated is pivoted at the right end of the lever 31. A compressed coil spring 34 is disposed between the plunger 35 and the shaft 32 and the spring 34 provides the lever 31 with the clockwise rotational force.

When the solenoid for the black mode setting is in a not-energized state (color mode), the belt 25 carrying the recording paper 267 thereon is in contact with the drums 18bk, 18y, 18m and 18c. When the recording paper 267 is placed on the belt 25 and toner images are formed on all of the drums 18bk, 18y, 18m and 18c, toner images for each of the images are transferred on the recording paper 267 accompanying with the movement of the recording paper 267 (color mode). When the black mode setting solenoid is energized (black mode), the lever 31 rotates counterclockwise against the resiliency of the spring 34, by which the roller 27 is lowered by 5 mm, the belt 25 aparts from the drums 18y, 18m and 18c, while being kept in contact with the drum 18bk. In this state, since the recording paper 267 on the belt 25 is in contact only with the drum 18bk, only the black toner images are transferred on the recording paper 267 (black mode). Since the recording paper 267 is not in contact with the drums 18y, 18m and 18c, toners deposited to the drums 18y, 18m and 18c (residual toner) do not adhere at all to the recording paper 267 and, accordingly, contamination with yellow, magenta, cyan, etc. does not appear at all. That is, in the reproduction by the black mode, same copies as those in the usual monochromatic black copying machine can be obtained.

Figure 6:
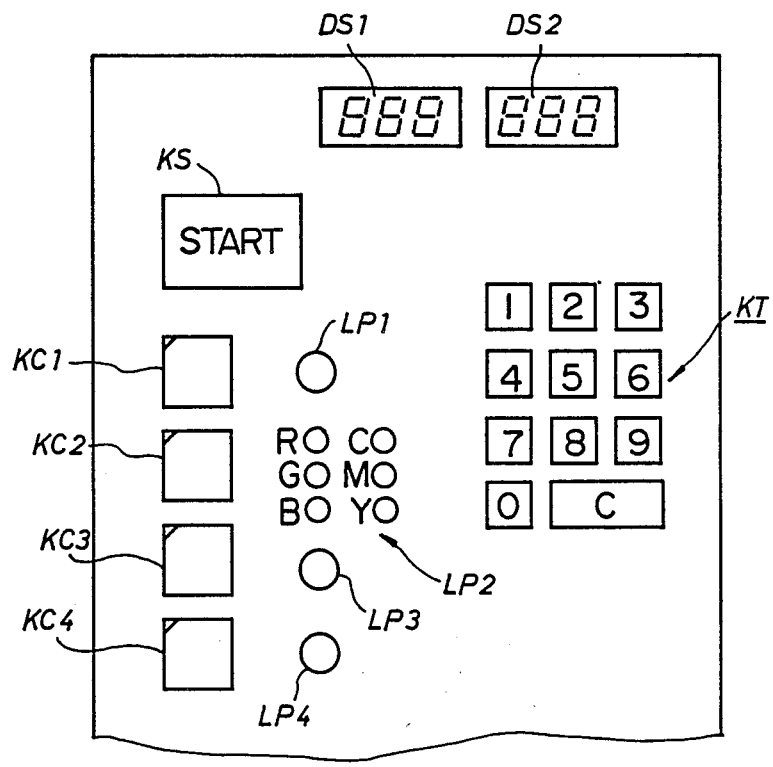
FIG. 6 is a plan view for a console board of the copying machine shown in FIG. 1.

FIG. 6 shows the outer looking of a console board 300 disposed to the copying machine shown in FIG. 1.

The board 300 is provided with a copy start key switch KS, a ten key KT, mode keys KC1, KC2, KC3, KC4, displays DS1, DS2, and display lamps LP1, LP2, LP3 and LP4.

Explanation will be made briefly to the function of main keys.

The key KC1 is used for designating the full color mode, the key KC2 is used for designating the monochromatic recording mode and key KC3 is used for designating the black/white recording mode. Further, the key KC4 is used for designating the ON/OFF for the color eliminating operation. When the color elimination operation is set to ON by the key KC4, those portions on the original document 1 at high saturation are eliminated and do not appear on the copy image. However, this color eliminating operation is invalid during the full color mode designated by the key KC1 and the operation is made valid in the monochromatic recording mode by the key KC2 or in the black/white recording mode by the key KC3. In the monochromatic mode by the key KC2, any one of colors C, M, Y, R, G and B can be designated as the recording color.

Figure 7:
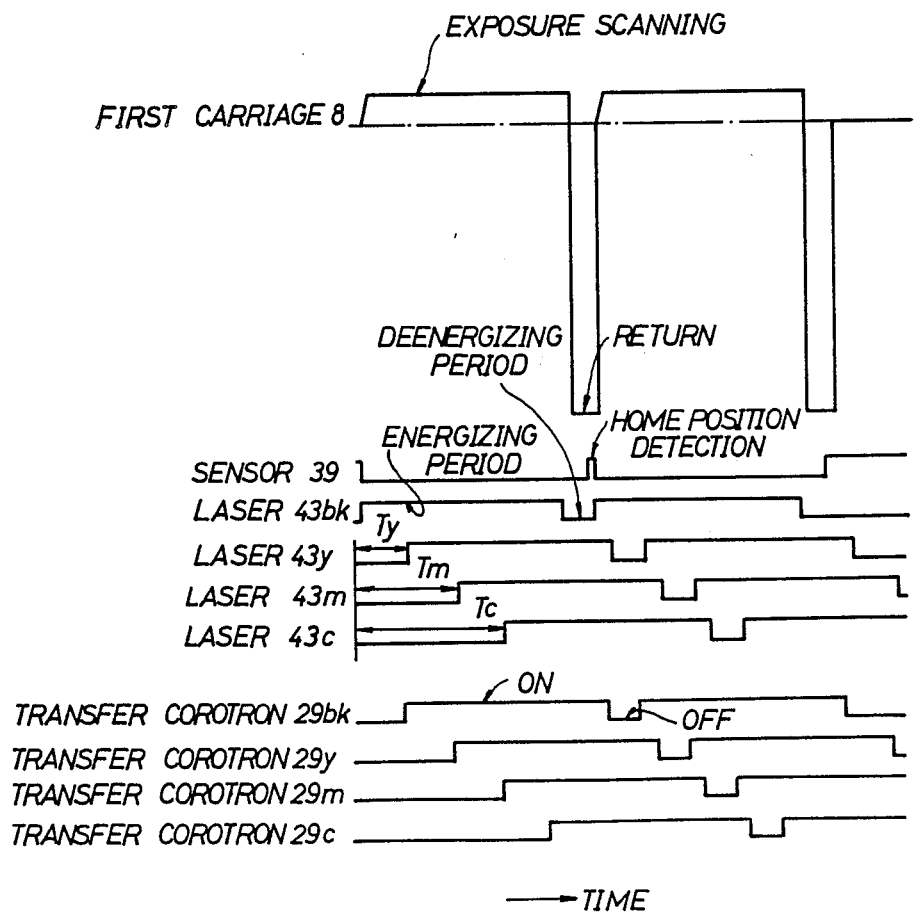
FIG. 7 is a timing chart for the main portions of the copying machine shown in FIG. 1.

Explanation will then be made to the operation timing for the main portions of the copying machine while referring to the time chart shown in FIG. 7.

The time chart in FIG. 7 shows the case where two sheets of identical full color copies are prepared. About at the same timing with the start of the exposure scanning by the carriage 8, energization for the modulation based on the recording signal for the laser 43$bk$ is started, and modulating energization is started for the lasers 43$y$, 43$m$ and 43$c$ respectively with the delay for the moving time Ty, Tm and Tc of the belt 25 for the distance from the drum 18$bk$ to the drum 18$y$, 18$m$ and 18$c$. The transfer chargers 29$bk$, 29$y$, 29$m$ and 29$c$ are energized after a delay of a predetermined of time for the start of the modulating energization for the lasers 43$bk$, 43$y$, 43$m$ and 43$c$ (the times in which the portions on the drums 18$bk$, 18$y$, 18$m$ and 18$c$ irradiated with laser beams reach the transfer chargers 29$bk$, 29$y$, 29$m$ and 29$c$) respectively.

Explanation will then be made referring to FIG. 3. The image processing unit 100 converts image signals for three colors read by CCD 7$r$, 7$g$ and 7$b$ into each of recording signals black (BK), yellow (Y), magenta (M) and cyan (C) required for recording. While the BK recording signal is applied as it is to a laser driver 112$bk$, the Y, M and C recording signals are possessed in buffer memories 108$y$, 108$m$ and 108$c$ respectively and, thereafter, read out after the delay time Ty, Tm and Tc shown in FIG. 7 applied to gradation processing circuit 109, which is formed of ROM tables and which forms images with gradation by a dither processing, and then applied to laser drivers 112$y$, 112$m$ and 112$c$. While three color signals are applied from the CCD 7$r$, 7$g$ and 7$b$ to the unit 100 in the copying mode, three color signals are applied from the outside of the copying machine by way of an outer interface circuit 117 in the graphics mode. Also shown in FIG. 3 is synchronous control circuit 114 which outputs timing pulses to the other circuits of the image processing unit 100 and to the laser drivers 112$bk$, 112$c$, 112$m$ and 112$y$ in response to command signals from the CPU 202 in order to synchronize operation of the circuits of unit 100 and laser drivers 112$bk$, 112$c$, 112$m$ and 112$y$.

The shading compensation circuit 101 of the unit 100 reads the color gradation data prepared by applying A/D conversion to the output signals from CCD 7$r$, 7$g$ and 7$b$ into 8 bits signals while applying compensation to optical illumination unevenness, sensitivity scatterings among unit elements inside of the CCD 7$r$, 7$g$ and 7$b$, etc., to prepare the color gradation data. A multiplexer 102 is adapted to selectively output one of the signals R, G, B of the output from the circuit 101 and the signals R, G, B of the output from the circuit 117.

The γ compensation circuit 103 receiving the output (color gradation data) from the multiplexer 102 is used for compensating the signals outputted from an image input device in accordance with the characteristics thereof and for obtaining an optional input characteristics as desired.

A color conversion circuit 70 is connected to the output terminal of the circuit 103. Briefly, the circuit 70 processes inputted color signals R (red), G (green) and B (blue) to prepare color signals Y (yellow), M (magenta), C (cyan) and BK (black).

FIGS. 8$a$ and 8$b$ show the specific structure of the circuit 70. The respective signals R, G and B outputted from the circuit 103 are applied to three input terminals Rin, Gin and Bin shown in FIG. 8$a$ respectively.

In FIG. 8$a$, the circuit 70 comprises a UCR processing circuit 151, a masking processing circuit 152, a data selectors 153 and 154, a black extraction circuit 160, a maximum value extraction circuit 170 and a color compensation circuit 180.

The circuit 160 extracts the black component contained in the inputted image signals. This processing can be attained basically by selectively outputting the signal with the lowest level among the inputted signals R, G and B. For instance, assuming the levels for the signals R, G and B as 40%, 50% and 60% respectively, since the level component with the minimum 40% contains all of the color components of red, green and blue, it can be regarded as black. That is, it is recognized as equivalent with the black component at 40% level, the green color component at 10% and the blue color component at 20%.

However, since each of the toners of cyan, magenta and yellow used in the recording system gives an effect also on the wavelength components other than desired, if the result for the extraction of the black component by the processing as described above is utilized, the saturation of the recorded images tends to be lowered as compared with that of the original document 1. In view of the above, all of most preferred black component levels (BK1) are previously determined depending on the combinations for the respective levels of the signals R, G and B while considering the characteristics of the respective toners over the entire wavelength region, and all of them are stored in the corresponding addresses of the ROM (read only memory) in this embodiment.

Input signals R, G, B each of 6 bits are applied to the corresponding address terminals of the ROM constituting the circuit 160. Accordingly, when signals are applied to the input terminals Rin, Gin and Bin, black signal BK1 in accordance with the combination of these levels are outputted automatically from the circuit 160. The circuit 151 compensates each of the signals R, G, B in accordance with the level of the extracted signal BK1. That is, assuming the levels for the respective input signals R1, G1 and B1 as R1, G1, B1 respectively, the levels (R2, G2 and B2) of each of the outputted signals R2, G2 and B2 are expressed as below:

$$R2 = R1 - BK1 \quad (1)$$
$$G2 = G1 - BK1$$
$$B2 = B1 - BK1$$

The processing is conducted on the condition that the rule of addition can be established for the density in the recording system and, if the actual recording characteristics have a relatively large deviation to the rule of addition, a corresponding compensation may be conducted.

The circuit 152 prepares cyan color signal C1, magenta color signal M1 and yellow color signal Y1 based on the signals R2, G2 and B2 outputted from the circuit 151. The content of the processing is expressed by the following equation (2):

$$C1 = k11 \cdot R2 + k12 \cdot G2 + k13 \cdot B2 \quad (2)$$
$$M1 = k21 \cdot R2 + k22 \cdot G2 + k23 \cdot B2$$
$$Y1 = k31 \cdot R2 + k32 \cdot G2 + k33 \cdot B2$$

where k11 to k33 respectively represent constants.

The signals C1, M1 and Y1 each of 6 bits outputted from the circuit 152 are applied to A group of the input terminals A1, A2 and A3 of the data selector 153 respectively.

The circuit 170 selectively outputs a signal with the maximum level among the inputted signals. The circuit 170 comprises three comparators 171, 172 and 173, an encoder 175 and a data selector 174. The comparator 171 compares the level between the signal R1 and the signal G1 and outputs the result of the comparison (if R1>G1 or not) as a binary signal. The comparator 172 compares the level between the signal R1 and the signal B1 and outputs the result of the comparison (if R1>B1 or not) as a binary signal. In the same manner, the comparator 173 compares the level between the signal G1 and the signal B1 and outputs the results of the comparison (if G1>B1 or not) as a binary signal.

The encoder 175 prepares 2-bit coded signals corresponding to 3-bit signals outputted from the comparators 171, 172 and 173 and applies the signal to the control terminal S of the data selector 174. The data selector 174 selects one of the signal R1, signal G1 and signal B1 in accordance the coded signal outputted from the encoder 175 and outputs the signal as the black signal BK2 to the data selector 154. That is, if the result of the comparison by the comparators 171, 172 and 173 are R1>G1 and R1>B1, the data selector 174 outputs the signal R1 as the signal BK2, if the result of the comparison are $\overline{R1>G1}$ and G1>B1, the data selector 174 outputs the signal G1 as the signal BK2, if the result of the comparison are $\overline{R1>B1}$ and $\overline{G1>B1}$, the data selector 174 outputs the signal B1 as the black signal BK2.

The signal BK1 outputted from the circuit 160 and the signal BK2 outputted from the circuit 170 are respectively applied to the input terminals A and B of the data selector 154. The data selector 154 selectively outputs the signal BK1 if the signal SG1 applied to the control terminal S is "H", while the data selector 154 selectively outputs the signal BK2 if the signal SG1 is "L". The signal SG1 is outputted from the main control unit 200 shown in FIG. 3.

The signal outputted from the data selector 154 is applied to the color compensating circuit 180. The circuit 180 prepares a cyan color signal C2, a magenta color signal M2, and a yellow color signal Y2 based on the black color signal BK3 outputted from the data selector 154. These signals C2, M2 and Y2 are used in the case of the monochromatic recording mode.

The circuit 180 comprises three ROM (read only memory) 181, 182 and 183 outputting the signal C2, M2 and Y2 respectively. The circuit 180 is disposed by the reason described below.

Relationships between the signals outputted from the circuit 152 and the densities of the color toner images recorded thereby are identical with each other, that is, the relationship between the signal C1 and the density of the cyan color toner image recorded therewith, the relationship between the signal M1 and the density of the magenta color toner image recorded therewith and the relationship between the signal Y1 and the yellow color toner image recorded therewith. Accordingly, the ratio of the signals C1, M1, Y1 corresponds to the hue of the recorded color.

Figure 9A:
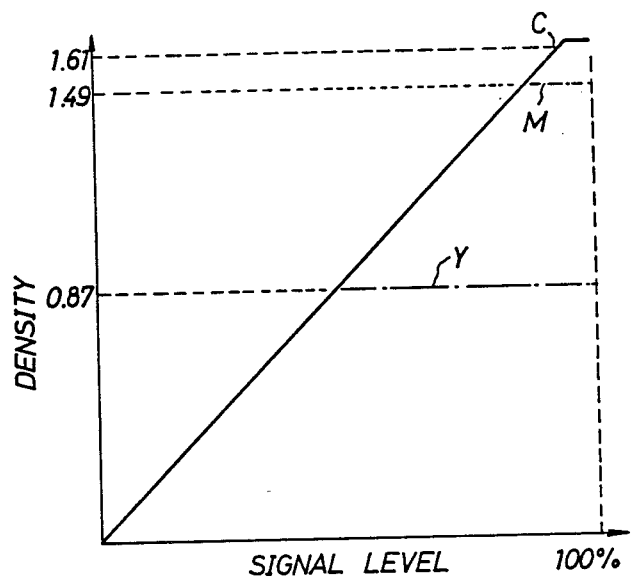
FIGS. 9a and 9b are graphs showing the relationship between the signal level and the recording density for the energization of recording.

FIG. 9a shows the relationship between the levels for the signals C1, M1 and Y1 and the density of the toner images recorded therewith at the main wave length. Further, the Table 1 below shows the density of each of cyan, magenta, yellow and black toners at each of the wavelength regions when recorded evenly.

TABLE 1

| Toner | Red wavelength | Green wavelength | Blue wavelength |
|---|---|---|---|
| Cyan | 1.61 | 0.60 | 0.22 |
| Magenta | 0.18 | 1.49 | 0.60 |
| Yellow | 0.03 | 0.06 | 0.87 |
| Black | 1.68 | 1.68 | 1.68 |

As can be seen from FIG. 9a and Table 1, the level of the yellow and magenta toners are saturated at a relatively low density. Since it is necessary to make the hue of the images to be recorded identical with that of the original document in the case of the full color recording, the relationship between the signal level and the recording density has to be set as shown in FIG. 9a.

Figure 9B:
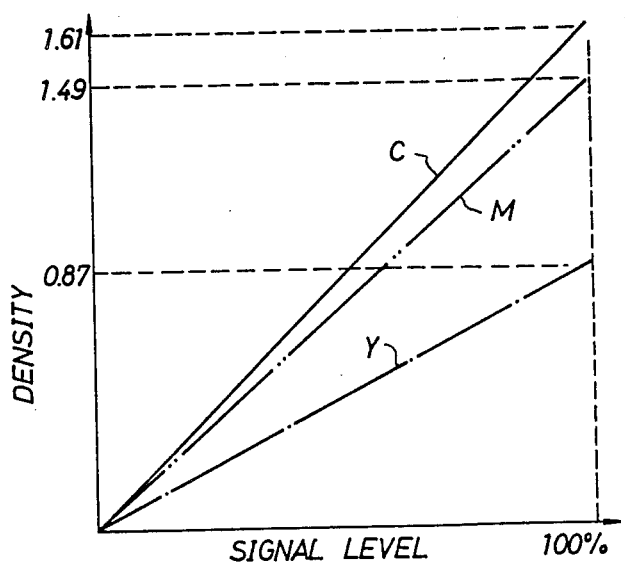

However, if these relationships are applied as they are also in the case of the monochromatic recording, if a signal greater than about 50% is inputted, for example, in a yellow color recording system, since the recording density enters the saturated region, the input signal level and the recording density are no more in proportion with each other. That is, in the area where the input signal is at high level, the gradation of the signal does not reflect on the recording density. By the way, in the case of recording the cyan color, magenta color or yellow color in the monochromatic color mode, it is not necessary for taking the hue of the recording color into consideration. Then, in order that the recording density may not enter the saturated region, the relationships between the level of the color signals outputted from the signal compensation circuit 180 and the density of the color toner images recorded therewith, that is, the relationship between the level of the cyan color signal C2 and the density of the cyan color toner image, the relationship between the signal M2 and the density of the magenta color toner image and the relationship between the signal Y2 and the density of the yellow color toner image are adjusted independently of each other to obtain the characteristics as shown in FIG. 9b.

That is, the respective signals C2, M2 and Y2 are prepared as shown by the following equation (3) based on the signal BK3.

$$C2 = BK3 \cdot Rc/Rbk \quad (3)$$
$$M2 = BK3 \cdot Gm/Gbk$$
$$Y2 = BK3 \cdot By/Bbk$$

where Rc, Gm and By respresent respectively the density of cyan toner at red wavelength, density of magenta toner at green wavelength and density of yellow toner at blue wavelength, while Rbk, Gbk and Bbk respresent respectively density of black toners at red, green and blue wavelength. That is, in the case of using the toners having the characteristics, for example, in Table 1 above, the respective parameters are described as below.

Rc:1.61, Rbk:1.68
GM:1.49, Bbk:1.68
By:0.87, Bbk:1.68.

Preparation of the signals C2, M2 and Y2 in accordance with the equation (3) is conducted only when the cyan color, magenta color or yellow color is designated as the recording color upon monochromatic mode.

That is, if the signal formed in accordance with the equation (3) above is used in the case of the monochromatic recording for red, green or blue color, yellow becomes strong in the case of conducting the monochromatic recording for the red color, yellow becomes strong in the case of conducting the monochromatic recording for the green color and red is strong in the case of conducting the monochromatic recording for the blue color thus deviating from the red, green or blue hue considered usually.

In view of the above, in the case of conducting the monochromatic recording for the red, green or blue color in this embodiment, the signals C2, M2 and Y2 are formed respectively in the following manners:

In the case of monochromatic recording for red color:

$$C2 = 0 \quad (4)$$
$$M2 = Krm \cdot BK3 \cdot Gm/Gbk$$
$$Y2 = Kry \cdot BK3 \cdot By/Bbk$$

where Krm and Kry represent respectively a constant each of 1 or smaller in which either one of them is less than 1. In the case of monochromatic recording for green color:

$$C2 = Kgc \cdot BK3 \cdot By/Bbk \quad (5)$$
$$M2 = 0$$
$$Y2 = Kgy \cdot BK3 \cdot Rc/Rbk$$

where Kgc and Kgy represent respectively a constant each of 1 or smaller in which either one of them is less than 1. In the case of monochromatic recording for blue color:

$$C2 = Kbc \cdot BK3 \cdot Rc/Rbk \quad (6)$$
$$M2 = Kbm \cdot Bk3 \cdot Gm/Gbk$$
$$Y2 = 0$$

where Kbc and Kbm represent respectively a constant each of 1 or smaller in which either one of them is less than 1.

That is, the ratio between each of C2, M2 and Y2 is varied by the adjustment for the ratio of the constants (Krm/Kry, Kgc/Kgy, Kbc/Kbm), thereby adjusting the hue. However, since each of the constants Krm, Kry, Kgc, Kgy, Kbc and Kbm is less than 1, the maximum value for the level of the signals C2, M2 and Y2 is less than the level corresponding to the maximum density of the toner images (saturation density) recorded therewith in the same manner as in the case of conducting the monochromatic recording of cyan, magenta or yellow (equation (3)). That is, since the levels of the signals C2, M2 and Y2 varies in the range out of the saturation region of the recording density, the degradation of the recorded images is not impaired.

In this embodiment, the constants described above are set as below:

| Krm: 1 | Kry: <1 |
|---|---|
| Kgc: 1 | Kgy: <1 |
| Kbc: 1 | Kgm: <1 |

That is, compensation to the hue of red, green and blue considered usually is conducted by reducing the yellow in the case of monochromatic recording for red or green, and by reducing the red in the case of monochromatic recording for blue.

Referring again to FIG. 8a, each of ROMs 181, 182 and 183 constituting the circuit 180 has a 8 bit address terminal and 6 bit data terminal in which signals from the data selector 154 are applied to the 6 bit address terminals. The signal SG2 is applied for the remaining 2 bit of the address terminals.

The signal SG2 is outputted from the main control unit 200 shown in FIG. 3, which is set depending on the designated color upon monochromatic recording mode, that is, to 0 if the color is cyan, magenta or yellow, to 1 if the color is red, to 2 if the color is green and to 3 if the color is blue. That is, the signal SG2 is utilized for the switching of the ratio of the constants (Krm/Kry, Kgc/Kgy, Kbc/Kbm).

The ROMs 181, 182, 183 previously store the results of the calculations by the equations (3) to (6) depending on the signals BK3 and SG2 for all of the combinations of the input signals. Accordingly, when the signals BK3 and SG2 are applied, the result of the calculations by the equations (3) to (6) are instantly outputted from the output terminals (data terminals) of the ROMs 181, 182 and 183.

The signals C2, M2 and Y2 outputted from the circuit 180 are applied respectively to B group of the input terminals B1, B2 and B3 of the data selector 153. The data selector 153, depending on the level of the 1 bit control signal SG3 applied thereto, outputs the signals at the input terminals A1, A2 and A3 to the output terminals 01, 02 and 03 respectively if the level of the SG3 is at "H", while outputs the signals at the input terminals B1, B2 and B3 to the output terminals 01, 02 and 03 respectively if the level of the SG3 is at "L". That is, the signals C1, M1 and Y1 are selected if the signal SG3 is at "H", whereas signals C2, M2 and Y2 are selected if the signal SG3 is at "L".

Figure 8A:
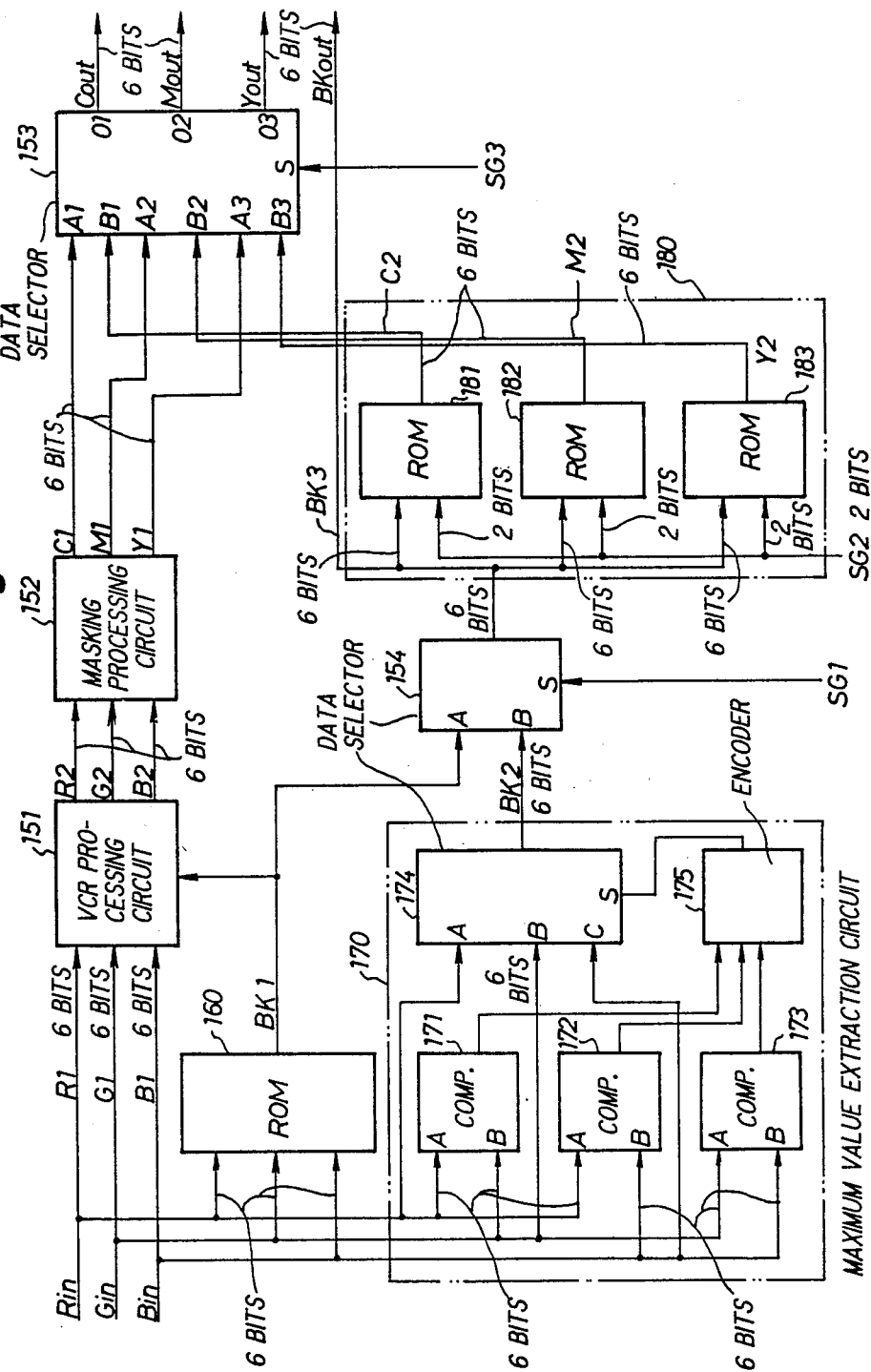
FIGS. 8a and 8b are block diagrams for the color conversion circuit shown in FIG. 3.
Figure 8B:
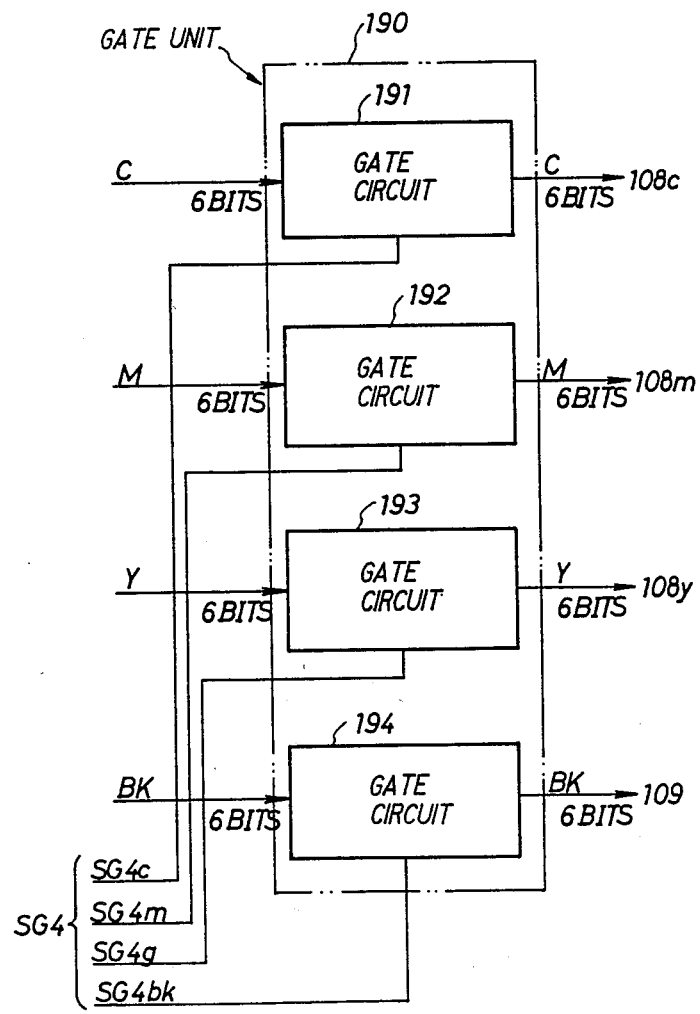

The signals outputted from the data selector 153 and the BK3 are sent by way of the terminals Cout, Mout, Yout and BKout to a gate unit 190 shown in FIG. 8b. The unit 190 comprises four gate circuits 191, 192, 193 and 194 in which cyan, magenta, yellow and black signals are inputted to the circuits 191, 192, 193 and 194 respectively. Output terminals of the circuits of the respective circuits 191, 192, 193 and 194 are connected as the output terminals from the circuit 70 to the input terminals of the memories 108c, 108m, 108y and the gradation processing circuit 109 respectively.

The circuits 191, 192, 193 and 194 allow the signals C, M, Y, BK to pass therethrough respectively if the signals SG4c, SG4m, SG4y and SG4bk applied thereto are at "H", whereas output "0" to the respective output terminals if the signals SG4c, SG4m, SG4y and SG4bk are at "L". 4 bit control signal SG4 is outputted from the unit 200 shown in FIG. 3.

Figure 10A:
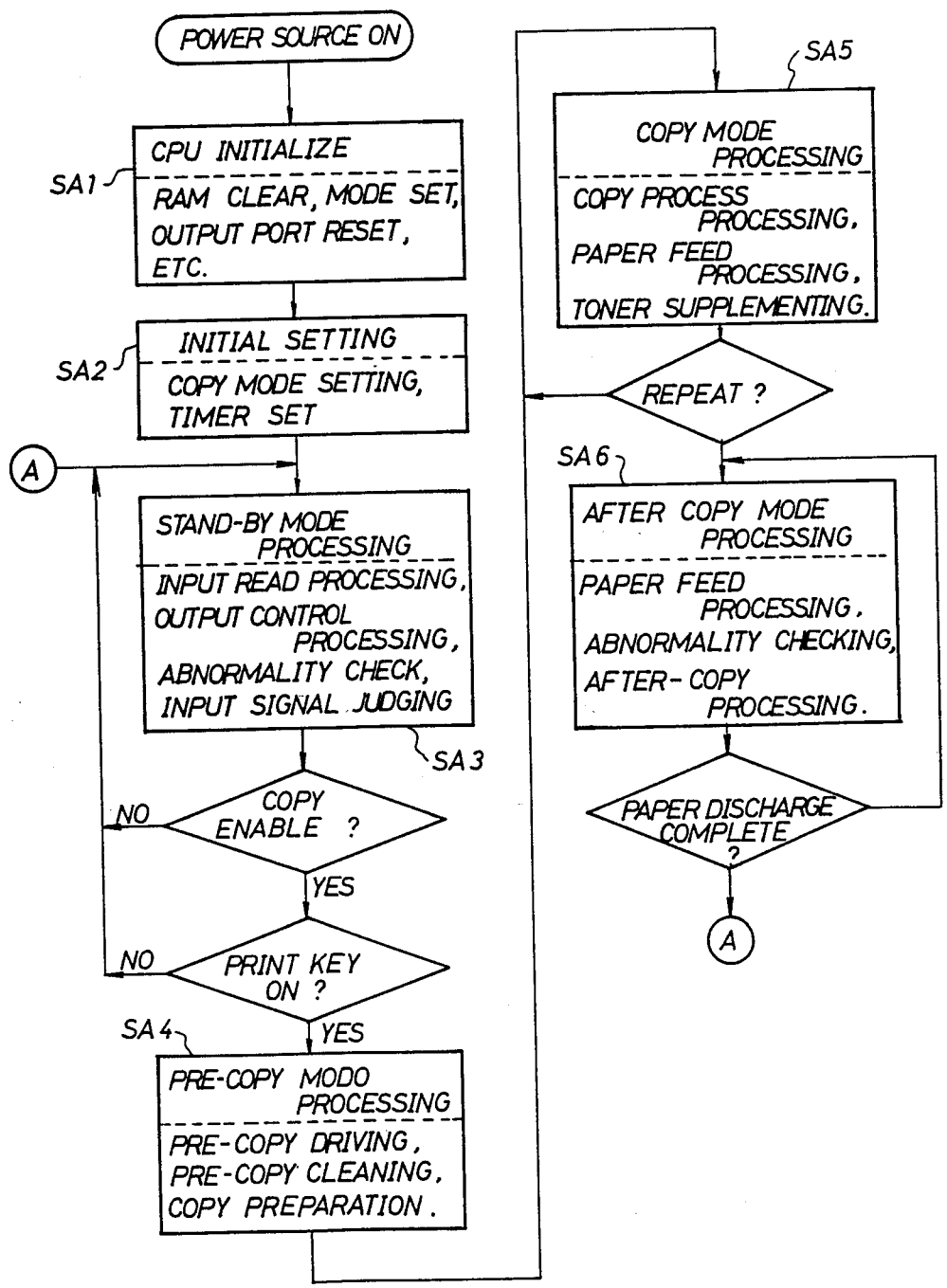
FIG. 10a through FIG. 10d are, respectively, flow charts illustrating the operation of the microprocessor in the main control unit shown in FIG. 3.

FIG. 10a shows the outline of the operation of the microprocessor 210 in the unit 200 shown in FIG. 2. When the power source is turned on, CPU initialization is conducted at first at the step SA1. In this processing, the state of the unit 200 per se is initialized. That is, the contents of the respective read/write memories are cleared, each of the mode settings is initialized and the output port is reset. Then, initial setting is conducted at the step SA2. In this processing, the states for each of the ports and each of the devices connected to the unit 200 (operation mode) are initialized to set so that the copying machine is put to the initialized state. At the step SA3, stand-by mode process is conducted. At this instance, the copying operation is stopped and the copying machine is in the stand-by state. In this step, the following processings are carried out. At first, the state of signals applied to each of the input ports is read and the result is stored in predetermined memories. Then, the data group for output control stored previously in the memories are outputted to the output ports corresponded to the respective data, to control the devices connected to the output ports. Further, the state for each of the input ports previously read and stored in the memory are judged to check the absence or presence of the abnormality. If there is any abnormality, a predetermined abnormality processing is executed. If there is no abnormality, the state for other input ports are judged and, for example, input processing from the operation board is conducted. Further, display data previously stored in the memory are outputted at a predetermined timing to predetermined output ports and the data are displayed by each of the displays on the operation board.

If the state is not copy enable, or if the print start key KS does not turn ON, the stand-by mode processings described above are executed repeatedly. Copy enable can not be attained in a case, for example, if the fixing temperature is out of a predetermined range or in a case if abnormality is detected.

When the print start key KS is pushed in the copy enable state, pre-copy mode processing is executed at the step SA4. In this processing, driving start for the main motor, pre-copy cleaning processing for the photosensitive drum, paper feeding processing, etc. are conducted as the processing just prior to the start of the copying process.

When the step SA4 has been completed, the copy mode processing is executed at the step SA5. The copying process is actuatlly conducted at this instance. The processing includes copy process processing, paper feed processing, toner supplementing processing, abnormality check, processing, etc. In the copy process processing, ON/OFF control is conducted for each of the process elements at a predetermined timing in synchronous with output pulses from a timing pulse generator that generates pulses corresponding to the rotational amount of the main motor. In the case of preparing a plurlaity of copy sheets continuously, the copying mode processing at the step SA5 is executed repeatedly.

When the copy mode processing has been completed at the step SA5 to the final copy, the after-copy mode processing is executed at the step SA6. This processing includes the discharge processing for the paper transferred with copy images, cleaning to the photosensitive drum after copying, etc. When the paper discharging has been completed, the flow returns to the stand-by mode processing at the step SA3 to repeat the processings described above.

Figure 10B:
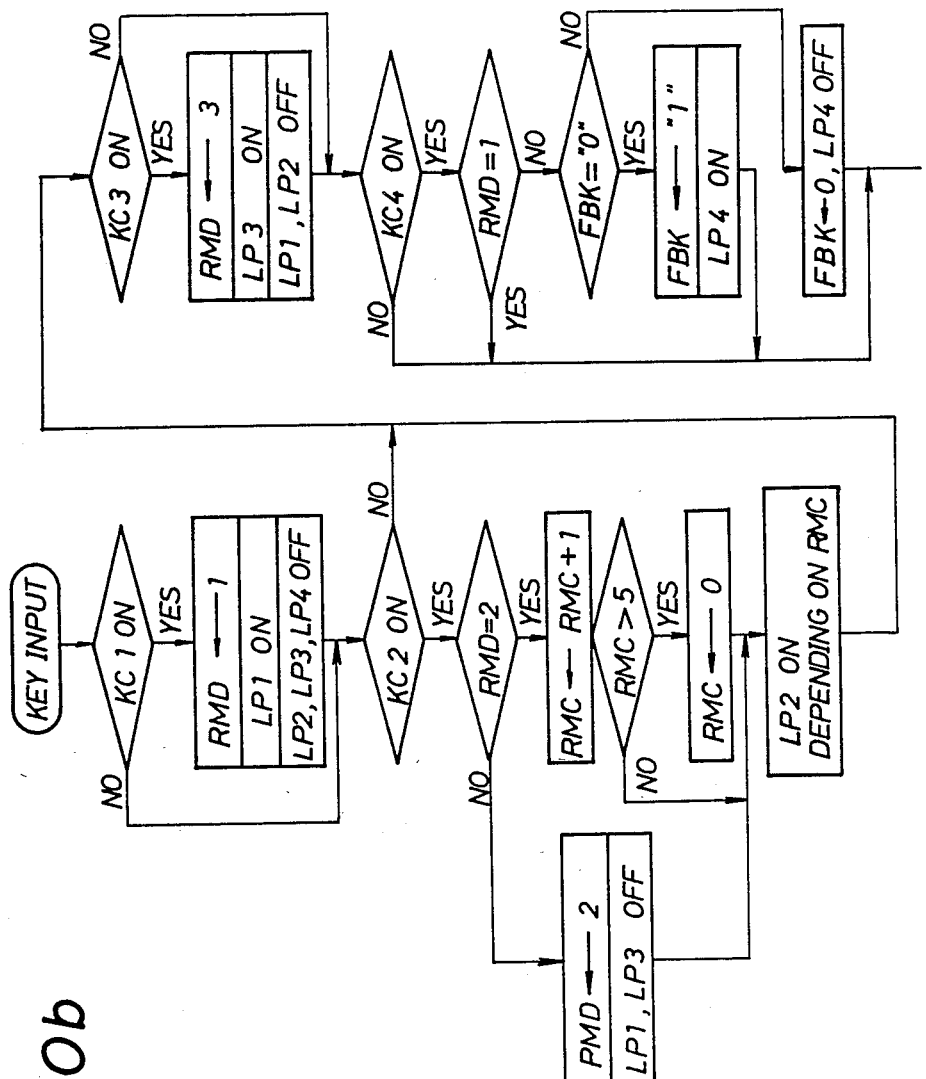

The stand-by mode processing at the step SA3 includes the key input processing from the operation board. A portion of such processing is shown in FIG. 10b. Referring to FIG. 10b, the full color mode key KC1 is at first checked. When the key KC1 is turned ON, "1" is loaded to a mode register RMD, a display lamp LP1 on the operation board is lighted up, while other display lamps LP2, LP3 and LP4 are put off.

Next, the key KC2 is checked. If KC2 is turned ON, the content of the mode register RMD is successively checked. If the content of RMD is other than 2, that is, if the mode is not the monochromatic recording mode, "2" is stored in the register RMD, the display lamps LP1 and LP3 are put off and one of the lamps LP2 is lighted up in accordance with the content of the register RMC. If the content of RMD is 2, that is, if the mode is the monochromatic recording mode, the content of the register RMC is incremented (+1). If the result exceeds, 5, "0" is loaded to RMC.

Then, the key KC3 is checked. When the key KC3 is turned ON, "3" is set to the mode register RMD, the display lamp LP3 is lighted up and the display lamps LP1 and LP2 are put off. Then, the key KC4 is checked. In the case where the KC4 is turned ON, the content of the mode register RMD is then checked. If RMD is not 1, that is, if it is not in the full color mode, the following processing is executed. The flag FBK is checked and, if it is "0", it is set to "1", and the display lamp LP4 is lighted up. If FBK is "1" it is reset to "0" and the display lamp LP4 is put off. In a case where the full color mode is designated, the color eliminating function becomes invalid.

Figure 10C:
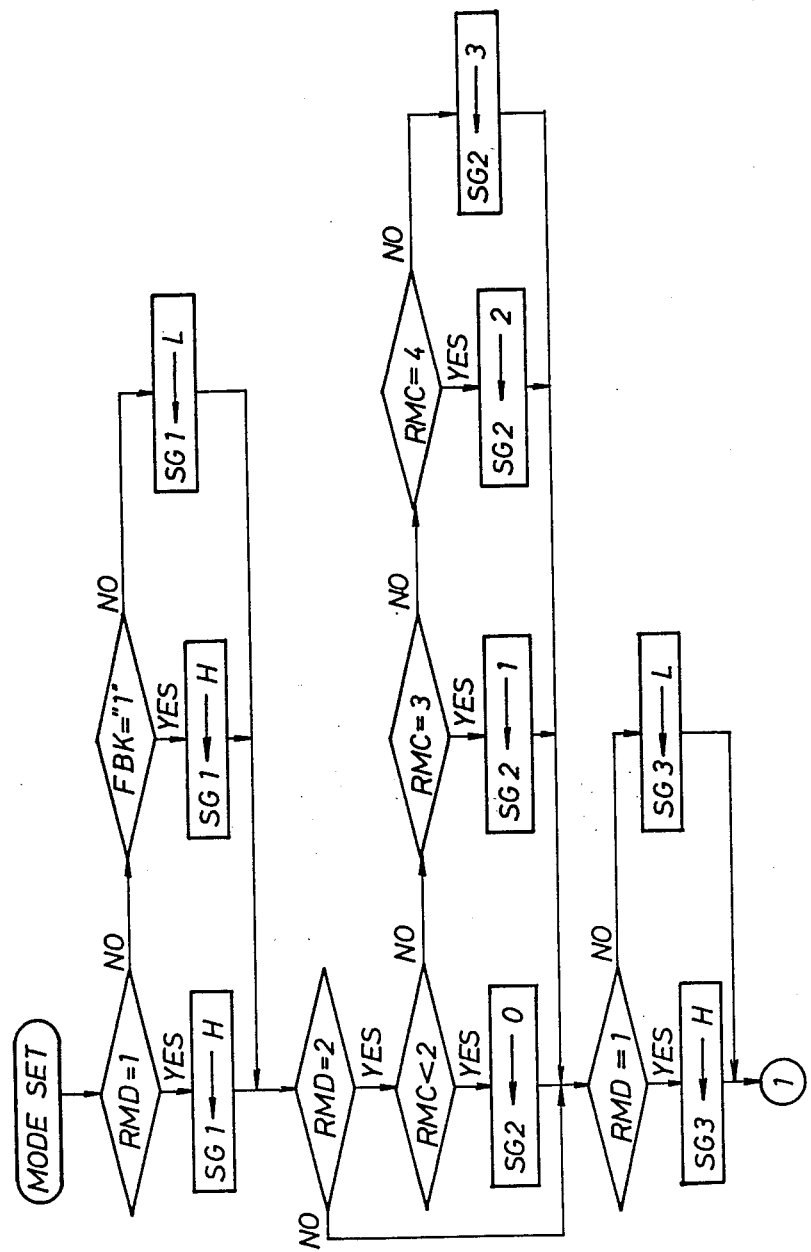
Figure 10D:
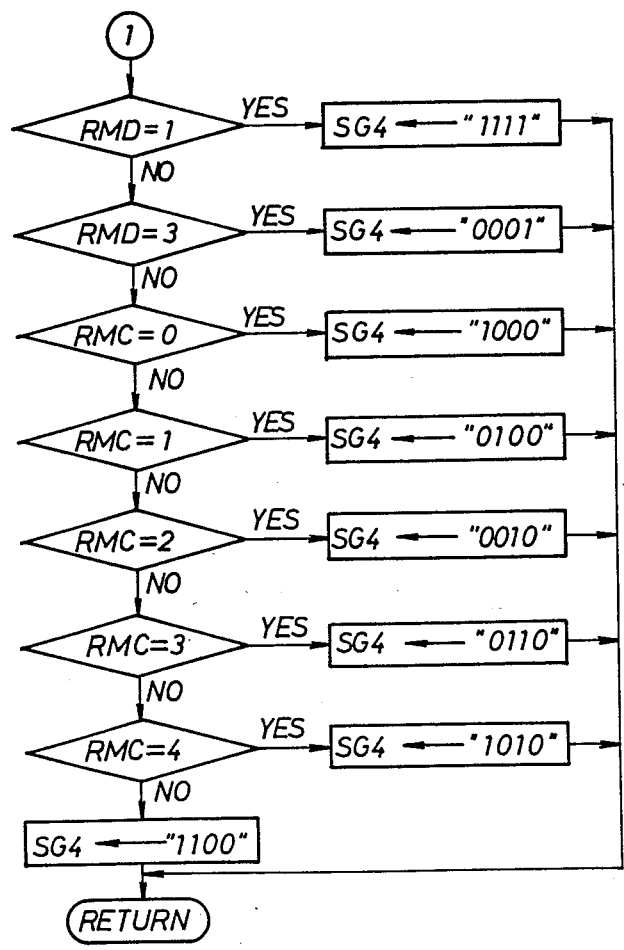

The pre-copy mode processing at the step SA4 in FIG. 10a includes the processing of setting the state of the control signals SG1, SG2, SG3 and SG4 applied to the circuit 70. FIG. 10c and FIG. 10d show the contents of the mode setting processing. Referring at first to FIG. 10c.

It is checked at first whether the content of the mode register RMD is "1" or not, that is, if it is in a full color mode or not. If RMD is "1", the control signal SG1 is set to "H". Accordingly, in the case of full color mode, the black signal BK1 outputted from the black extraction circuit 160 shown in FIG. 8a is selected in the data selector 154 and outputted as BK3. If RMD is not "1", the state of the flag FBK is checked and if it is "1", that is, if the color eliminating function is ON, the signal SG1 is set to "H". If FBK is "0", SG1 is set to "L".

Then, it is checked if the content of the mode register RMD is 2 or not, that is, if it is in the monochromatic recording mode or not. If the RMD is 3, the content of the register RMC is further checked. Then, if RMC is less than 2, that is, if the designated color is C, M or Y, "0" is outputted as the signal SG2. If RMC is 3, that is, if the designated color is red, "1" is outputted as the signal SG2. Further, if RMC is 4, that is, if the designated color is green, "2" is outputted as the signal SG2.

Further, if RMC exceeds 4, that is, if the designated color is blue, "3" is outputted as the signal SG3.

Then, it is checked if the content of the mode register RMD is 1 or not, that is, if it is in the full color mode or not. If RMD is "1", "H" is outputted as the signal SB3 and, if not, "L" is outputted as the signal SG3. Accordingly, in the case of the full color mode, the data selector 153 shown in FIG. 8a, selects the signals C1, M1 and Y1 and outputs them to the gate unit 190. If it is not in the full color mode, the data selector 153 selects the signals C2, M2, Y2 and then outputs them to the gate unit 190. The data selector 154 outputs the first monochromatic signal BK1 and the selector 153 outputs the signal C1,M1,Y1, and the image recording means are supplied the first monochromatic signal BK1 and the signals C1,M1,Y1 from the selectors 154 and 153 through gate 190 in a case where the color mode is selected by the mode key KC1. The selector 154 outputs the first monochromatic signal BK1 in a case where the monocolor mode is selected by the mode key KC2 or KC3 and the color elimination mode is selected by the mode key KC4. The selector 154 outputs the second monochromatic signal BK2 and supplies it to the image recording means through the gate 190 in a case where the monocolor mode is selected by the mode key KC2 or KC3 and the color elimination mode by the mode key KC4 is not selected. The selector 153 outputs the signals C2,M2,Y2 generated based on the signal BK2 selected by the selector 154 and supplies them to the image recording means through the gate 190.

Referring then to FIG. 10d, if the mode register RMD is "1", that is, if it is in the full color mode, "1111" is outputted as the signal SG4. Accordingly, recording is conducted with four color toners in accordance with C2, M2, Y2 and BK1 in the full color mode. If the mode register RMD is 3, that is, it is in the black/white recording mode, "0001" is outputted as the signal SG4. Accordingly, in the black/white recording mode, the recording system only for the black is energized while all of the recording systems for cyan, magenta and yellow are put to the non-recording state.

If RMD is neither 1 nor 3, that is, if it is in the monochromatic recording mode, the content of the register RMC is successively checked. Then, if RMC is 0, 1, 2, 3, 4 and 5, "1000", "0100", "0010", "0110", "1010" and "1100" are outputted respectively as the signal SG4. That is, in the case of the monochromatic recording mode, cyan, magenta and yellow recording systems are energized respectively if the designated color is cyan, magenta and yellow magenta and yellow recording systems are energized if the designated color is red, yellow and cyan recording systems are energized if the designated color is green, while the cyan and magenta recording systems are energized if the designated color is blue.

What is claimed is:

1. A digital color copying machine comprising:
    a color-decomposing means for color-decomposing color image projected thereto into three fundamental colors and generating three digital color signals corresponding respectively to said three fundamental colors;
    a color conversion means connected to said color-decomposing means for extracting a black component and one signal with the greatest density level from said three digital color signals and generating a plurality of fundamental color signals corresponding to said three digital color signals, a first signal corresponding to said black component and a second signal corresponding to said one signal;
    an image recording means connected to said color conversion means for recording on a predetermined medium images in the color corresponding to at least one of said fundamental color signals, said first signal and said second signal supplied thereto from said color conversion means respectively; and
    a control means connected to said color conversion means for controlling signals delivered by said color conversion means such that said color conversion means delivers to said image recording means a plurality of said fundamental color signals and said first signal when said image recording means records said images in a plurality of colors corresponding to a plurality of said fundamental color signals and said first signal, delivers to said image recording means said second signal when said image recording means records said images in the color corresponding to said second signal, and delivers to said image recording means said first signal when said image recording means records said images in the color corresponding to said first signal.

2. A machine according to claim 1, in which said color conversion means has a read only memory storing previously the most preferable black component levels corresponing to each combination for the respective levels of said three digital color signals supplied thereto.

3. A machine according to claims 1 or 2, in which said color conversion means has three comparators, and said comparators compare two digital color signals supplied thereto with respect to a density level.

* * * * *